Patented Jan. 28, 1941

2,229,882

UNITED STATES PATENT OFFICE 2,229,882

PROCESS FOR THE PRODUCTION OF COATING PREPARATIONS

Josef Binapfl, Eugen Bock, and Friedrich Frick, Krefeld-Uerdingen, and Otto Jordan, Mannheim, Germany, assignors to I. G. Farbenindustrie Aktiengesellschaft, Frankfort-on-the-Main, Germany No Drawing. Application June 24, 1937, Serial No. 150,130. In Germany October 24, 1931

6 Claims. (Cl. 260—736)

The present invention relates to the production of preparations suitable for coating and impregnating.

Rubber latex, emulsions of drying oils and the like have already been employed for the manufacture of coatings, but these emulsions possess various disadvantages; thus, for example, rubber latex yields poorly adhering films, requiring subsequent vulcanisation and the coatings obtainable by means of emulsions of drying oils require a very extended period of drying.

We have found, that valuable coating preparations can be prepared by emulsifying solutions of solid practically sulfur-free conversion products of rubber materials, soluble in organic solvents, that is of the different varieties of natural rubber and rubberlike substances, such as gutta percha, balata or polymerisation products of butadiene hydrocarbons, in water or aqueous solutions, in which the aforesaid solutions are insoluble or practically insoluble. To the said conversion products either before or after the formation of the emulsions, organic film-forming substances, such as for example, drying oils or resinlike condensation products of a drying nature, may be added, or these film-forming substances may be also employed as the solvents for dissolving the said conversion products. The aqueous emulsions prepared in accordance with the present invention can be employed for various technical purposes and furnish quickly drying and firmly adhering coatings.

As examples of conversion products of rubber materials for use in the process according to the present invention, we may cite products resulting from the chlorination of rubber and containing from about 58 to 65% by weight of chlorine or the products of the bromination of rubber which contain up to about 70% of bromine; products resulting from the treatment of rubber with hydrogen chloride and containing from about 20 to about 32% by weight of chlorine; products resulting from the treatment of rubber with hydrogen chloride and then with chlorine, and containing from about 36 to about 67% by weight of chlorine; the artificial isomers of rubber having less chemical unsaturation than rubber which are obtainable for instance by reacting India rubber and like natural rubber materials with aromatic sulfonic acid or the halogenides thereof (see U. S. Patent No. 1,605,180 to Fisher) or with phosphorus oxychloride, sulfoacetic acid or hydrogen fluoride (see application Ser. No. 653,921 to Julius Söll), it being understood that only such compounds can be employed as are still soluble or at least capable of swelling in organic solvents; solid hydrogenation products of rubber; polycyclo rubber, i. e. the product obtainable for example by heating a solution of rubber at a temperature of 250° C. for several hours; and the products obtainable by the action of boron fluoride on a solution of rubber in an inert solvent in the presence of phenols or derivatives of phenols.

The several chlorine-containing rubber compounds which we may use in accordance with this invention may contain chlorine in the form of HCl or Cl₂ for example within amounts shown in the following table:

| | Chlorine content range Per cent |
|---|---|
| Chlorinated rubber hydrochloride | 50–67 |
| Chlorinated rubber hydrochloride | 40–50 |
| Chlorinated rubber hydrochloride | 36–40 |
| Rubber hydrochloride | 20–32 |
| Chlorinated rubber | 40–75 |

The products resulting from dissolving the said rubber conversion products in film-forming materials, for example, drying oils, such as linseed oil, China-wood oil, artificial resins known as alkyd resins, for example, the products obtainable from glycerol, glycols, mannitol, and like polyhydric alcohols by simultaneous or successive esterification with a monobasic carboxylic acid, such as butyric, palmitic, stearic, oleic, benzoic and rosin acid, and especially with a monobasic carboxylic acid of drying nature furnishing alkyd resins with drying properties, for example linoleic acid and the dehydration products of ricinoleic acid etc. and one or more polybasic carboxylic acids, such as phthalic, trimellitic, adipic, succinic or maleic acids have proved to be particularly valuable for the purpose of the present invention. The viscous to semi-solid solutions produced can, if desired or required, be mixed with volatile solvents, for example, benzene hydrocarbons or hydrogenation products thereof, chlorinated hydrocarbons, for example, methylene chloride, monochlorobenzene, furthermore other organic solvents, such as esters, ketones etc. Furthermore siccatives for the purpose of accelerating the drying may be added, for example, the naphthates, resinates and linoleates of cobalt, lead and manganese.

For many purposes it is unnecessary to combine the film-forming materials, such as drying oils or alkyd resins with the rubber conversion products before the emulsification; in these cases the said film-forming substances can be added to the finished emulsion of a dissolved rubber conversion product.

To the emulsions adulterants can be added, for example, softeners and solvents, such as phthalic acid esters, phosphoric acid esters, adipic acid esters, castor oil and other non-drying oils or semi-drying oils, alkyl naphthalenes, high molecular aliphatic alcohols, such as cetyl alcohol, octodecyl alcohol, esters thereof or oxy-alkyl or vinyl ethers, as well as soft resins, such as the ethyl ester of abietic acid, viscous liquid hydrogenation products of rubber and also bitumens, artificial or natural asphalts, pitches, waxy chlorinated diphenyls and naphthalenes or condensation products thereof, as well as polymerised ethers of vinyl alcohol and other polyvinyl compounds, as for example, polystyrols and polyacrylic acid esters, viscous, liquid or soft solid polymerisation products of alkylene oxides, such as of ethylene oxide, etc.

The proportions between the rubber conversion products and the additions can vary within wide limits. It is recommended to employ softening agents in general preferably in quantities of less than 50% by weight of the rubber conversion products. Soft resins can be admixed in quantities up to about 75 to 100% by weight of the rubber conversion product. Conversely bitumens can be employed in quantities up to about 500% according to the properties required in the ultimate product in particular with regard to hardness of coatings prepared from the emulsions.

The manufacture of the emulsions is carried out in the manner customarily employed for producing emulsions; stabilisers as for example solutions of film-forming substances having dispersive properties and protective colloids, such as gelatine, glue, water-soluble ethers of carbohydrates, casein-compounds, polyethylene glycol compounds, wax soaps, wetting agents, for example water-soluble salts of sulfonic acids and sulfuric esters of organic compounds of high molecular weight may be added to the emulsions or to water employed for their preparation. If desired, clays, such as bentonite as well as humic acids or salts thereof may be added to the emulsions for increasing the stability of the emulsions.

It will be advantageous to produce the emulsions in such a manner that the rubber conversion products as well as the other additions are first dissolved in organic solvents, for example, in benzene hydrocarbons or hydrogenation products thereof, in chlorinated hydrocarbons, for example, methylene chloride, monochloro-benzene, etc., whereupon the solution is poured into water while stirring. Other organic solvents, such as esters, ketones, in particular cyclic ketones, higher liquid alcohols, such as butyl alcohol, can be employed in conjunction therewith. If desired or required, soluble dyestuffs or pigments of inorganic or organic origin, filling materials, such as ground slate, bauxite, quartz meal, micaceous iron ore, carborundum, graphite, metal powders, asbestos, can likewise be added to the emulsions obtainable in accordance with the known methods. Sometimes it is serviceable to treat the mixtures in a homogeniser in order to obtain a homogeneous emulsion.

The final emulsions are well adapted for the manufacture of coatings or substances for impregnating the surfaces of wall of any kind, such as concrete or masonry, of paper, pasteboard, wood, leather, textiles and other absorptive substrata, furthermore and in particular when the aqueous phase contains soaplike products or slightly alkaline substances also for the manufacture of coatings on metal surfaces to which, if required, one of the known covering materials may have been previously applied.

The emulsions can be brought on to the substrata, for example, by spraying, dipping or brushing; they can also be employed after appropriate adjustment, as printing inks, for example, as intaglio printing inks. The resulting prints dry quickly, with the result that stickiness is avoided to a large extent. Finally the emulsions can also be used in the manufacture of paper on the paper machine as fillers, sizes and impregnating agents. For some purposes it may be advantageous to incorporate the aqueous phase of the emulsions with small quantities of a water-soluble cellulose ether, such as alkyl cellulose, for example, methyl cellulose and oxyethyl methyl cellulose.

The coating materials obtainable by means of solutions of rubber conversion products of the above kind comprising film-forming substances are particularly suitable for dressing split leather and grain leather.

The following examples will further illustrate the nature of this invention, but the invention is not restricted to these specific examples; the parts are by weight.

*Example 1*

200 parts by weight of chlorinated rubber (chlorine content about 63–65%) and 50 parts by weight of tricresyl phosphate are dissolved in 750 parts by weight of a mixture of equal parts of toluene and xylene, if desired about 20 parts by weight of red iron oxide are added, and the mixture is emulsified in a homogeniser with a solution of 150 parts by weight of casein, 23 parts by weight of borax and 20 parts by weight of the sodium salt of butyl-naphthalene sulfonic acid in 807 parts of water, some chlorocresol or formaldehyde being added, if desired.

The resulting mass can be applied by brushing and can be used for coating wood, textiles, masonry, paper and the like.

*Example 2*

360 parts by weight of chlorinated rubber (chlorine content about 60–68%) are dissolved in 240 parts by weight of linseed oil varnish with the addition of 8 parts by weight of a linoleate siccative solution possessing a metal content of about 6.3% of lead and about 1.4% of manganese and then worked into an emulsion with an alkaline aqueous solution consisting of 60 parts by weight of casein, 12 parts by weight of borax and 12 parts by weight of technical aqueous ammonia (specific gravity 0.91) in 320 parts of water; if desired or required, the emulsion can be further diluted with water. The stable emulsion obtained can be employed for colorless coatings or, after the incorporation of pigments or filling agents, as a primer or covering paint.

*Example 3*

262 parts by weight of chlorinated rubber (chlorine content about 60–68%) are first homogenized by warming from about 100° to about 140° C. with 131 parts by weight of linseed oil varnish and 131 parts by weight of China-wood oil with the addition of 9 parts by weight of a naphthenate siccative solution, having a metal content of about 6.8% of lead and 1.4% of manganese; then a pigment, for example 162 parts by weight of iron oxide previously ground in a grinding machine with 48 parts by weight of castor oil, are incorporated. This mass is then emulsified with an alkaline aqueous solution consisting of 26 parts by weight of casein, 5 parts by weight of technical aqueous ammonia and 5 parts by weight of borax in 150 parts of water. The resulting colored emulsion can be further diluted with water as required in accordance with the nature of the intended application, for example, by means of a brush or rollers or spraying appliances.

Example 4

100 parts by weight of a rubber conversion product, obtained by the action of boron fluoride on a solution of rubber in benzene in the presence of crude cresol are homogenized by warming from about 100 to about 150° C. with 100 parts by weight of linseed oil varnish with the addition of 20 parts by weight of solvent naphtha and 3 parts by weight of a naphthenate siccative solution, having a metal content of about 6.8% of lead and about 1.4% of manganese. This product is then emulsified with an aqueous ammoniacal solution consisting of 10 parts by weight of casein in about 100 parts of water containing about 2 parts by weight of ammonium borate and 2 parts by weight of technical ammonia solution, the resulting emulsion being employed as described in Examples 1 or 2 as a coating preparation either as such free from or after the addition of a pigment.

Example 5

167 parts by weight of chlorinated rubber (chlorine content about 60–68%) are first dissolved by warming in 167 parts by weight of a resinous condensation product of dry nature obtained by condensing 872 parts by weight of linseed oil, 184 parts by weight of glycerine and 444 parts by weight of phthalic anhydride. Then the solution obtained is incorporated with 83 parts by weight of tricresyl phosphate, 50 parts by weight of solvent naphtha and 5 parts by weight of a naphthenate siccative solution, having a metal content of about 6.8% of lead and 1.4% of manganese, and emulsified with a solution containing 160 parts of water, 42 parts by weight of casein, 8 parts by weight of ammonium borate, 8 parts by weight of technical ammonia and 0.8 part by weight of a solution of 30 parts by weight of trichlorophenol in 70 parts by weight of amino ethanol. After the addition of 208 parts by weight of iron oxide pigment, the emulsion is diluted with 450 parts of water.

This application is a continuation in part of our application Ser. No. 638,412, filed October 18, 1932.

We claim:

1. Composition of matter suitable for coating and impregnating purposes comprising an aqueous emulsion of a solution of chlorinated rubber in linseed oil.

2. Composition of matter suitable for coating and impregnating purposes comprising an aqueous emulsion of a solution of chlorinated rubber and a drying alkyd resin from phthalic acid, glycerine and linoleic acid.

3. The process which comprises emulsifying with water an aqueous emulsion comprising a solution of chlorinated rubber in linseed oil.

4. The process which comprises emulsifying with water an aqueous emulsion comprising a solution of chlorinated rubber and a drying alkyd resin from phthalic acid, glycerine and linoleic acid.

5. A preparation suitable for coating and impregnating purposes which is in the form of an emulsion and which comprises a substantially water-immiscible solution of a rubber compound selected from the group consisting of chlorinated rubber, chlorinated rubber hydrochloride and rubber hydrochloride, and of water and an emulsifying agent, the solution of the rubber compound being emulsified with water.

6. A method of producing preparations suitable for coating and impregnating purposes and which include a rubber compound selected from the group consisting of chlorinated rubber, chlorinated rubber hydrochloride and rubber hydrochloride, which method comprises admixing water and a solution of the rubber compound in a solvent therefor which is immiscible with water, in the presence of an emulsifying agent.

JOSEF BINAPFL.
EUGEN BOCK.
FRIEDRICH FRICK.
OTTO JORDAN.